Sept. 22, 1964 C. J. MURPHY 3,149,608
CONCEALED FILTERING AND AERATING MEANS FOR FISH TANKS
Filed Oct. 19, 1962 2 Sheets-Sheet 2
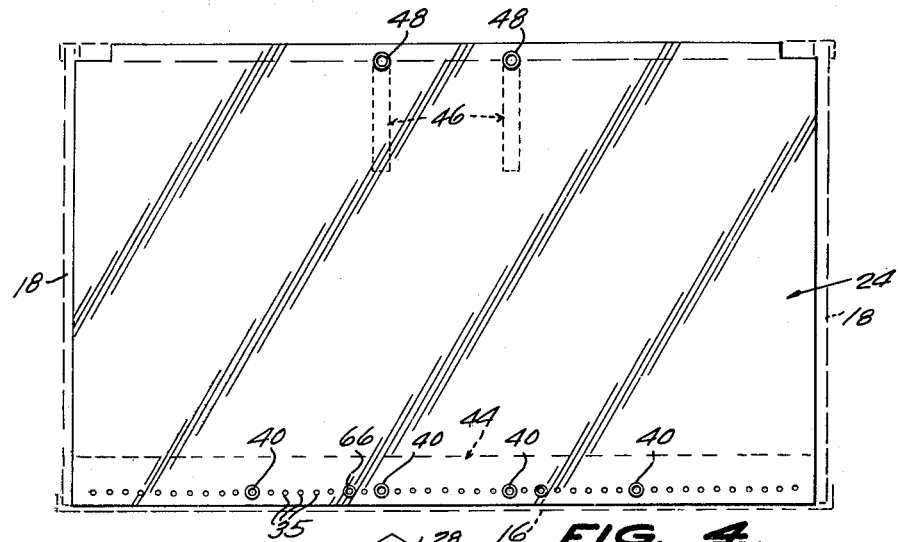
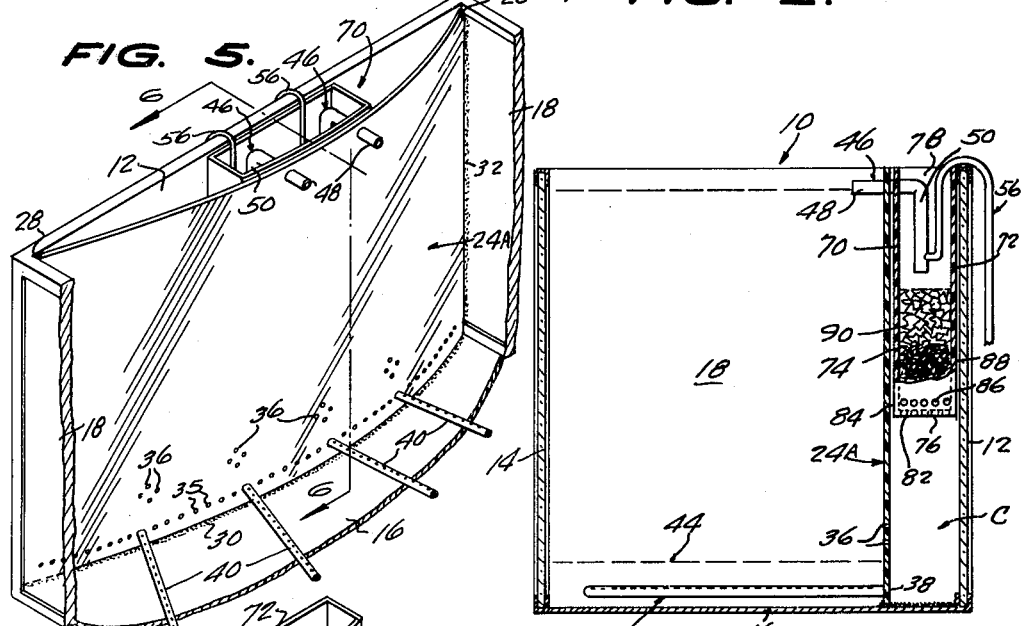
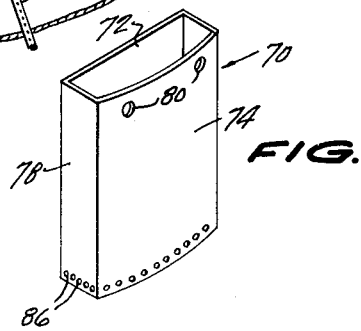
INVENTOR.
CLARENCE J. MURPHY,
BY
McMorrow, Berman + Davidson
ATTORNEYS.

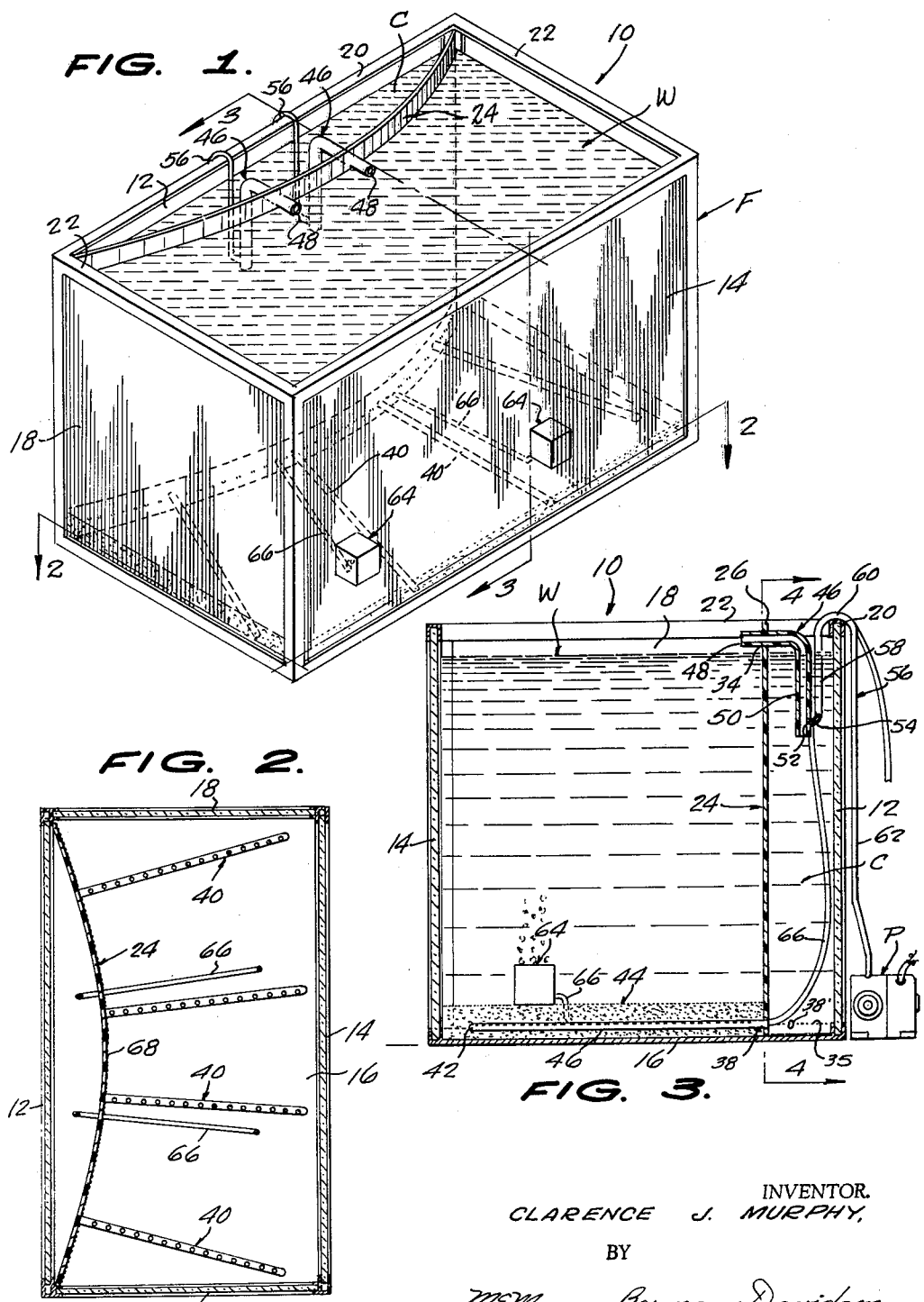

United States Patent Office 3,149,608
Patented Sept. 22, 1964

3,149,608
CONCEALED FILTERING AND AERATING MEANS FOR FISH TANKS
Clarence J. Murphy, 417–19 N. Broadway, Joliet, Ill.
Filed Oct. 19, 1962, Ser. No. 231,705
5 Claims. (Cl. 119—5)

This invention relates to novel concealed filtering and aerating means, for fish tanks, which provide uncluttered and unobstructed backgrounds, at the rear sides of the tanks, which can be plain or decorative, for setting off the fish and other contents of the tanks.

The primary object of the invention is the provision of more efficient and more practical means of the kind indicated, wherein various unsightly filter, and pump tubes, and their appurtenances, which usually clutter up the backs of fish tanks, are concealed in a compartment defined by a partition wall extending across and spaced from the back wall of a fish tank, the front or exposed side of the partition wall being adapted to be either plain and unobtrusive, or decorated in any desired manner, in order to provide a background for fish swimming in the tank.

Another object of the invention is the provision of means of the character indicated above, wherein the said compartment serves as a pumping compartment, whose actions are supplemented by perforated filtering tubes which extend along the bottom of the tank, between the partition wall and the front wall, and between the side walls of the tank, and are covered and concealed by filtering sand.

A further object of the invention is the provision of means of the character indicated above, wherein filtering actions of the bottom filtering tubes and the sand is augmented by a filtering box suspended in the compartment, on a level spaced above the filtering tubes and sand, the filtering box having a perforated bottom wall overlaid by filtering and water-sweetening materials, and being suspended from tubes already present in the compartment.

A still further object of the invention is the provision of means of the character indicated above, which provides for the concealed and effective use of accessories, such as heaters, in fish tanks.

Other important objects and advantageous features of the invention will be apparent from the following description and the accompanying drawings, wherein, for purposes of illustration only, a specific form of the invention is set forth in detail.

In the drawings:

FIGURE 1 is a front perspective view of a fish tank equipped with filtering and aerating means of the present invention, and showing accessories installed upon the sand filtering material, with their tubes concealed in the sand;

FIGURE 2 is a horizontal section taken on the line 2—2 of FIG. 1;

FIGURE 3 is a vertical transverse section taken on the line 3—3 of FIGURE 1, showing an air pump connected to an air tube;

FIGURE 4 is a front elevation of the partition wall, taken on the line 4—4 of FIGURE 3;

FIGURE 5 is a fragmentary front perspective view, partly broken away and in section, showing a filtering box suspended in the filtering compartment;

FIGURE 6 is a vertical transverse section taken on the line 6—6 of FIGURE 5; and FIGURE 7 is a front perspective view of the filtering box per se.

Referring in detail to the drawings, wherein like numerals designate like parts throughout the several views, and first to FIGURES 1 through 4, a horizontally elongated, rectangular fish tank 10 is shown, which has transparent walls, consisting of a back wall 12, a front wall 14, a bottom wall 16, and end walls 18. The edges of these walls are set into related portions of a frame F, which includes a top rear portion 20, intersected by top end portions 22, which extend laterally inwardly into the tank 10.

A relatively narrow, vertical longitudinal filtering compartment C extends along the front of the tank back wall 12, and is defined by a partition wall 24, which is of a height to rest upon the tank bottom wall 16, with its upper edge 26 on a level with the tops of the top members of the frame F. Notches 28 are provided in the partition wall 24, at the ends of its upper edge 26, which accommodate the top end portions 22 of the frame. The partition wall 24 is longer than the distance between the tank end walls 18, is bowed forwardly away from the tank back wall 12, and has its ends bearing in the corners defined by the meetings of the back and end walls of the tank. The lower edge of the partition wall 24 bears upon and is cemented or otherwise sealed to the tank bottom wall 16, as indicated at 30, as are the end edges of the partition wall, as indicated at 32.

The partition wall is preferably made of suitable plastic, non-corrosive material which avoids imparting taste or other contamination to water W in the tank, which rises to a level close to the top of the tank. The partition wall 24 is imperforate, except for one or more, and preferably two relatively large upper, tube holes 34, located near the upper edge thereof, at the midlength point of the partition wall; and a plurality of equally longitudinally spaced relatively large lower tube holes 38.

Horizontal perforated aerating and filtering tubes 40 have their rear ends engaged in the lower tube holes 38 and have closed forward ends 42, located close to the tank front wall 14, the tubes 40 being near to and spaced above the tank bottom wall 16, as shown in FIGURE 3. As shown in FIGURE 2, the filtering tubes 40 are in forwardly divergent relationship, so that they fan out toward the tank end walls 18, and cover most of the area of the bottom of the tank 10. The rear ends of the tubes 40 are in communication with the compartment C.

A body 44 of filtering sand rests upon the tank bottom wall 16 and embeds and conceals the filtering and aerating tubes 40.

Inverted L-shaped, open ended pumping tubes 46 are located within the compartment C, have horizontal arms 48 extending forwardly and supportably through the upper tube holes 34, and perpendicular pendant arms 50, which are spaced from the tank back wall 12 and the partition wall 24. The pendant arms 50 have holes 52, at the rear sides thereof, near their lower ends, into which the bent ends 54 of air tubes 56 are secured. The air tubes 56 can be flexible and composed of vertical portions 58, within the compartment C, on which the bent ends 54 are formed, bight portions 60 which engage around the upper edge of the tank back wall 12, and pendant portions 62, which lead to air pumps P, suitably supported behind the tank 10.

If desired, air bubble accessories 64 can be used in the tank 10, which rest upon the sand 44, between the filtering tubes 40, which have flexible air tubes 66, which are embedded and concealed in the sand, as shown in FIGURE 3, and extend through spare lower tube holes 38', in the partition wall 24, into and up through the compartment C, over the upper edge of the tank back wall 12, and down to pumps (not shown).

As a result of the foregoing construction, the only things which interrupt the front surface 68 of the partition wall 24, are the unobstrusive horizontal arms 48 of the pumping tubes 46. The front surface 68 can be left plain, be homogeneously colored, or provided with decorative figures and designs. Conventional heaters can be suspended on the tank back wall 12 and positioned fully concealed in the compartment C.

In operation, as water is introduced into the tank 10, in front of the partition wall 24, the water sinks through the sand 44, and enters the compartment C, by way of the aerating and filtering tubes 40 and the holes 38. The level of the water W should be slightly below the horizontal arms 48 of the pumping tubes 46. When the pump P is operated, water is pumped from the compartment C and discharged into the main part of the tank 10, through the pumping tubes 46, so that the level and the volume of the water rises and produces further flow of water by siphon action down through the sand 44, and into the compartment C, via the tubes 40, so that the sand filters the water continuously as the pump P is operated and the water is aerated.

In the embodiment of the invention shown in FIGURES 5 to 7, the above outlined filtering action is supplemented by the provision of a filtering box 70, which is suspended within the open part of the compartment C, on the pumping tube arms 48. The box 70, preferably made of suitable plastic material, has an open top, a flat back wall 72, a forwardly bowed front wall 74, conforming in curvature to the partition wall, a flat bottom wall 76, and flat parallel end walls 78. The front wall 74 is formed, near its upper edge, with holes 80 which receive the horizontal arms 48 of the pumping tubes 46, so that the box is suspended with its upper end on a level with the upper edge of the tank back wall 16 and end walls 18, the box 70 being relatively narrow and greatly spaced from the tank end walls 18, with the pendant arms 50 of the pumping tubes extending downwardly and spacedly within the box 70. The box 70 is spaced, at a relatively great disance above the level of the sand 44. On a level just above the sand 44, the partition wall 24A is formed with apertures 35 and 36, which provide for limited transfer of water between the main part of the tank and the compartment C, of which the apertures 35 are below the level of the sand.

The box bottom wall 76 and lower end portions of the front and end walls of the box 70 are formed with horizontal rows of perforations 82, 84, and 86, respectively, which provide communication between the compartment C and the interior of the box 70, the walls of the box being otherwise imperforate. A wad 88 of fibrous filtering material, such as glass wool, fills the lower part of the box 70 and covers its perforations, and a quantity of bone charcoal 90 overlays the glass wool, to a depth between the lower ends of the pendant arm 50 of the pumping tubes 46. The arrangement of the box 70 is such that all water rising in the compartment C, toward the pumping tubes 46 is forced to pass through the glass wool and the bone charcoal, so that the water returned into the main part of the tank 10, is freed of any particles of food and the like, in the water, which are passed by the sand 44, and the water is purified and sweetened by the action of the charcoal in removing gases and other contaminants present in the water.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fish tank having a back wall, a front wall, end walls, and a bottom wall for receiving a layer of sand thereon, a partition wall extending along one of the walls and between the adjacent walls and the bottom wall, said partition wall having a central portion thereof spaced forwardly from said one wall and defining an open top water-conducting compartment, open-ended pumping tube means in said compartment below the level of the water in the main part of the tank behind the partition wall, said pumping tube means having a horizontal arm extending forwardly through the upper part of the partition wall above the level of the water, an air tube connected to a lower part of the pumping tube means below the level of the water and extending over said one wall for connection to an external air pump, the lower part of said partition wall having apertures below the level of said sand and providing limited communication between the main part of the tank and said compartment.

2. A fish tank as defined in claim 1, and a plurality of elongated aerating and filtering tubes having a pair of opposed open and closed ends, said tubes being disposed proximate said bottom wall in said main part of said tank and having their respective open ends connected to selected ones of said apertures.

3. A fish tank as defined in claim 2, wherein said partition wall is arcuate and extends between the junctions of said one wall with said adjacent walls.

4. A fish tank as defined in claim 3, and a filter box disposed in the upper end of said compartment, said box comprising a pair of oppositely-disposed, spaced front and back walls disposed in juxtaposition and having their respective pairs of ends connected by a pair of end walls, a bottom wall extending across and connecting said front, back and end walls, said front, back and end walls having a plurality of perforations extending transversely therethrough adjacent said bottom wall and said bottom wall having a plurality of perforations extending transversely therethrough, said filter box being supported on said horizontal arm which extends transversely through said front wall of said filter box and with said lower part of said pumping tube disposed in said filter box, said front wall of said filter box being adjacent said partition wall, and said back wall of said filter box being adjacent said back wall of said tank.

5. A fish tank as defined in claim 4, and filter material disposed within said box below said lower part of said pumping tube.

References Cited in the file of this patent

UNITED STATES PATENTS

| | | |
|---|---|---|
| 653,160 | Williamson | July 3, 1900 |
| 1,838,215 | De Clairmont | Dec. 29, 1931 |
| 2,491,853 | Feldman | Dec. 20, 1949 |
| 2,674,574 | Pettas | Apr. 6, 1954 |
| 2,730,496 | Zavod | Jan. 10, 1956 |
| 2,782,161 | Willinger et al. | Feb. 19, 1957 |
| 3,025,831 | Berardi | Mar. 20, 1962 |
| 3,077,697 | Fry | Feb. 19, 1963 |